United States Patent [19]
McGovern et al.

[11] 3,761,584
[45] Sept. 25, 1973

[54] PHENETHYL PROPIONATE AND EUGENOL, A POTENT ATTRACTANT FOR THE JAPANESE BEETLE (POPILLIA JAPONICA NEWMAN)

[75] Inventors: Terrence P. McGovern, Bowie; Morton Beroza, Silver Spring, both of Md.; Thyril L. Ladd, Willingboro, N.J.

[73] Assignee: The United States of America as represented by the Secretary of Agriculture, Washington, D.C.

[22] Filed: Dec. 9, 1970

[21] Appl. No.: 96,607

[52] U.S. Cl. ................................................ 424/84
[51] Int. Cl. ........................................... A01n 17/14
[58] Field of Search ...................................... 424/84

[56] References Cited
FOREIGN PATENTS OR APPLICATIONS
597,822   2/1948   Great Britain OTHER PUBLICATIONS
Langford et al., Journal of Economic Entomology, 39, 245–247, (1946).

*Primary Examiner*—Jerome D. Goldberg
*Assistant Examiner*—Allen J. Robinson
*Attorney*—R. Hoffman and W. Bier

[57] ABSTRACT

Phenethyl propionate when formulated with eugenol was up to 8.7 times more attractive than phenethyl butyrate and eugenol (9:1), the standard survey lure in present use.

6 Claims, No Drawings

PHENETHYL PROPIONATE AND EUGENOL, A POTENT ATTRACTANT FOR THE JAPANESE BEETLE (POPILLIA JAPONICA NEWMAN)

A non-exclusive, irrevocable, royalty-free license in the invention herein described, throughout the world for all purposes of the United States Government, with the power to grant sublicenses for such purposes, is hereby granted to the Government of the United States of America.

This invention relates to the phenethyl ester of propionic acid mixed with eugenol as an attractant for the Japanese beetle, Popillia japonica Newman.

The Japanese beetle is a destructive pest that occurs in large areas of the United States. It attacks almost 300 kinds of tree, shrubs, turf, field crops and garden plants. The adult beetle feeds on fruit, flowers, and foliage; the grub feeds on roots and underground stems of plants and when numerous causes serious damage to lawns and other turf areas. The yearly damage from this insect is estimated to be many millions of dollars. Attractants in traps are used to delineate the areas of infestation to show where insecticides should be applied and are also used to indicate the best time to apply control measures in order to minimize the damage caused by the insect. The need to apply insecticide only where needed and only as long as needed is especially important these days in our efforts to avoid polluting the environment with more insecticide than necessary.

Previous lures used as Japanese beetle attractants were 9:1 combinations of geraniol and eugenol [W. E. Fleming, E. D. Burgess, and W. W. Maines, U.S.D.A. Circular 594, 1940] and anethole and eugenol [W. E. Fleming and R. D. Chisholm, Journal of Economic Entomology, 37, 116, 1944]. The presently used standard survey lure is a 9:1 mixture of phenethyl butyrate and eugenol which was originally suggested by G. E. Langford and E. N. Cory in 1946 [Journal of Economic Entomology, 39, 245–247, 1946]. Although the chemical in this invention utilizes the next lower homolog of the phenethyl butyrate of the present standard, results from experiments carried out prior to those reported here would not lead one to expect phenethyl propionate and eugenol to have a much greater activity than the present standard. In fact the opposite would be expected from previous work. Thus, mixtures of eugenol and phenethyl acetate, another homolog of phenethyl butyrate, were found to be only slightly more attractive (1.3 times) to the beetle than both of the old standards, geraniol-eugenol (9:1) and anethole-eugenol (9:1). [G. S. Langford and E. Gilbert, Journal of Economic Entomology, 42, 146–147, 1949]. Since it was reported that a mixture of phenethyl butyrate and eugenol (9:1) was 2.2 times more attractive than the anethole-eugenol standard [P. H. Schwartz, D. W. Hamilton, C. W. Jester, and B. G. Townshend, Journal of Economic Entomology, 59, 1516–1517, 1966], the phenethyl acetate-eugenol mixture should be less attractive than the present phenethyl butyrate-eugenol standard. In an unpublished report on field screening of Japanese beetle attractants in 1967, D. W. Hamilton and B. G. Townshend reported a 9:1 mixture of phenethyl isobutyrate (isomer of phenethyl butyrate) and eugenol to be less than 50 percent as active as the phenethyl butyrate standard. Hence the information available on a homolog and a closely related isomer (both plus eugenol) would not lead one to expect that a homolog containing one less methylene group would exhibit exceptionally high activity.

One object of the present invention is to provide an attractant more potent than the one presently used in order to improve survey and control operations.

Another object is to provide an attractant less expensive than the one in use.

Another object is to provide an attractant useful in combination with other insect control agents, with the attractant serving to improve the efficacy of the insect control agents.

Still another object is to provide a means of controlling insects more effectively and with less hazard to man and wildlife.

Data showing the attraction of phenethyl propionate-eugenol to Japanese beetles compared with that of the standard lure is presented in Table 1. The lures were tested in Georgia by exposing the traps for 3 days in a mowed field of Lespedeza in a randomized complete block design. Each chemical was replicated four times and exposed in yellow Ellisco traps that were set on aluminum rods about 30 feet apart and about 44 inches above ground. The bait dispenser was a 1-oz bottle with a 0.5 inch diameter dental wick protruding 0.5 inch above the bottle cap.

Data showing the attraction of several lure combinations containing phenethyl propionate and eugenol to Japanese beetles compared with that of the standard lure are presented in Table 2. The tests were conducted in New Jersey. All of the combinations were at least two times more active than the standard. The most active combination was a 7:3 phenethyl propionate-eugenol mixture which was 4.4 times as active as the standard. The test samples were exposed in a manner similar to that described above. The tests were conducted for four days and the bait was dispensed from 0.25-inch-diameter wicks that protruded 0.5 inch above the bottle caps.

Although one might expect a compound to have a slightly higher activity than its adjacent homolog, one would not expect the exceptionally high activity of phenethyl propionate-eugenol, that is, 4 to 8 times more activity than the phenethyl butyrate-eugenol standard. That this result was unexpected as well as unusual is reinforced by the fact that the phenethyl butyrate-eugenol combination was discovered in 1946 and the high activity of the homolog-eugenol mixture was not found in the ensuing 23 years even though the project to find a better lure was active during those years. Also of interest and also unexpected is the fact that the 7:3 and even the 1:9 combinations of phenethyl propionate-eugenol were very attractive. This is an advantage because the composition of the lure (ratio of phenethyl propionate and eugenol) changes as it evaporates and the results in Table 2 show that the attraction is maintained despite wide variation in composition (1:9 to 9:1). A further advantage is that phenethyl propionate is much less expensive than phenethyl butyrate. Of further interest is the fact that the improved attraction of the new lure may make it possible to use the lure, which is a safe chemical, with an insecticide for the control of Japanese beetles. Such a use would decrease the amount of insecticide needed and thus dimish pollution of the environment.

The foregoing examples of attraction of Japanese beetles by chemical combinations are meant to be illustrative rather than limiting. For example, it should not be considered a departure from the present invention to vary the amount of attractant, to add inert material such as paraffin or paraffin mixtures in order to depress volatilization, or to use formulations of the attractants other than those specifically set forth in the specifications. Neither should the mixing of other materials such as insecticides, chemosterilants, weak attractants and food with the attractants of this invention be considered a departure from this invention. Table 1. Catches of Japanese beetles in traps baited with phenethyl propionate and eugenol (9:1) and relative attraction compared with the standard lure, phenethyl butyrate. Clermont, Georgia (June 25-28, 1969).

| Chemical (plus eugenol 9:1) | Beetles caught/replicate | | | | Total captures | Attractiveness rating |
|---|---|---|---|---|---|---|
| | 1 | 2 | 3 | 4 | | |
| Phenethyl propionate | 1,510 | 875 | 800 | 1,188 | 4,373 | 866 |
| Phenethyl butyrate (STD.) | 55 | 39 | 336 | 75 | 505 | 100 |

Table 2. Catches of Japanese beetles and relative attractiveness compared to 9:1 phenethyl butyrate-eugenol of various lure combinations containing phenethyl propionate and eugenol. Gibbsboro, New Jersey (July 10-14, 1969).

| Lure a | Beetles caught/replicate | | | | | Total catch | Attractiveness rating |
|---|---|---|---|---|---|---|---|
| | 1 | 2 | 3 | 4 | 5 | | |
| PEP-eugenol (7:3) | 3,948 | 5,836 | 1,341 | 1,844 | 5,610 | 18,579 | 435 |
| PEP-eugenol (1:9) | 6,409 | 1,699 | 5,499 | 2,285 | 2,521 | 18,413 | 431 |
| PEP-eugenol (9:1) | 1,734 | 1,427 | 1,530 | 1,898 | 2,150 | 8,739 | 205 |
| PEB-eugenol (9:1) standard | 1,505 | 364 | 560 | 425 | 1,417 | 4,271 | 100 |
| Control (unbaited) | 21 | 28 | 15 | 43 | 17 | 125 | | a PEP=phenethyl propionate; PEB=phenethyl butyrate.

We claim:

1. An attractant for Japanese beetles consisting of a mixture of nine parts of phenethyl propionate and one part of eugenol.

2. An attractant for Japanese beetles consisting of a mixture of seven parts of phenethyl propionate and three parts of eugenol.

3. An attractant for Japanese beetles consisting of one part of phenethyl propionate and nine parts of eugenol.

4. A method of attracting Japanese beetles comprising baiting a trap with an effective attractant amount of a mixture consisting of nine parts of phenethyl propionate and one part of eugenol.

5. A method of attracting Japanese beetles comprising baiting a trap with an effective attractant amount of a mixture consisting of seven parts of phenethyl propionate and three parts of eugenol.

6. A method of attracting Japanese beetles comprising baiting a trap with an effective attractant amount of a mixture consisting of one part of phenethyl propionate and nine parts of eugenol.

* * * * *